UNITED STATES PATENT OFFICE 2,595,140

OXIDATION RESISTANT LUBRICATING OIL COMPOSITION

Raymond L. Heinrich, Baytown, Tex., assignor, by mesne assignments, to Standard Oil Development Company, Elizabeth, N. J., a corporation of Delaware No Drawing. Application December 1, 1950, Serial No. 198,723

5 Claims. (Cl. 252—50)

The present invention is directed to an improved lubricating oil composition which is resistant to oxidation. More particularly, the invention is directed to a lubricating oil composition including an olefinic polymer boiling in the lubricating oil boiling range which is susceptible to oxidation.

In accordance with the present invention an olefinic polymer which is susceptible to oxidation and which boils in the lubricating oil boiling range and which has lubricating oil characteristics is blended in an amount in the range between 99.9% and 97.5% by weight with carbazole to produce a composition which has less tendency towards oxidation than the lubricating oil component of the composition. Furthermore, the improved composition does not form sludge on exposure to high temperature oxidation as other compositions do under those conditions.

The carbazole employed in the practice of the present invention is used in an amount no less than 0.1% by weight of the composition and an amount in the range between 0.1% and 2.5% by weight gives desirable results. A preferred amount is 2% by weight.

The olefin polymer may be obtained by polymerizing alpha olefins to produce polymers boiling in the lubricating oil boiling range and having lubricating oil characteristics. Such polymers may be produced by polymerizing alpha olefins boiling in the range from 100° to 400° F. in the presence of a Friedel-Crafts catalyst at a temperature of about 75° to 200° F. Olefins which may be polymerized to produce lubricating oil polymers include the alpha olefins having about 5 to 10 carbon atoms in the molecule including pentene-1, hexene-1, heptene-1, octene-1, nonene-1 and the higher members of the series mentioned. The olefin polymer as mentioned before will ordinarily be used in an amount in the range from 99.9% and 97.5% by weight with a preferred amount of about 98% by weight.

The invention will be further illustrated. A number of compositions were made up in which carbazole was added to a mineral oil in the amount of 2% by weight and to octene-1 polymer boiling in the lubricating oil boiling range in an amount of 0.5, 1.0 and 2.0% by weight. Acridine, related to carbazole, was also added to the mineral oil and octene-1 polymers. The several compositions were then oxidized by methods which will be described further and the oxidized compositions were then tested for the per cent increase in viscosity at 210° F., the neutralization value, the carbon residue, the per cent naphtha insoluble and the oxidized compositions were also observed for sludge formation. The results of these tests along with the amount of components added to either the mineral oil or the octene-1 polymer are presented in the following table:

Table

| Inhibitor | Weight Percent Inhibitor | Lubricant | Tests on Oxidized Oil | | | | |
|---|---|---|---|---|---|---|---|
| | | | Percent Increase, Vis. 210°F. | Neut. Value | Carbon Residue | Naphtha Insoluble | Sludge Formation |
| None | | Mineral Oil [1] | 114 | 14.9 | 1.2 | | None. |
| Do | | Octene-1 Polymer [2] | 247 | 11.6 | 3.3 | 0.3 | Do. |
| Carbazole | 2.0 | Mineral Oil | 6 | 4.2 | 0.2 | | Moderate. |
| Do | 0.5 | Octene-1 Polymer | 52 | 10.6 | 1.4 | 0.1 | None. |
| Do | 1.0 | do | 30 | 5.9 | 1.3 | 0.1 | Do. |
| Do | 2.0 | do | 11 | 7.6 | 0.5 | 0.0 | Do. |
| Acridine | 2.0 | Mineral Oil | 32 | 7.1 | 0.6 | | Light. |
| Do | 2.0 | Octene-1 Polymer | 225 | 14.0 | 3.0 | 0.2 | None. |

[1] Mineral White Oil, characteristics: 54.0 Vis. 210°F., SSU, 82 viscosity index.
[2] Octene-1 Polymer, characteristics: 47.7 Vis. 210°F., SSU, 120 viscosity index.

An examination of the data in the table shows that the composition in accordance with the present invention including carbazole and octene-1 polymer was superior to other compositions. For example, it was superior to the mineral oil compositions containing carbazole in that the composition of the present invention formed no observable amount of sludge which is quite advantageous in the operation of an internal combustion motor where the lubricating oil is subjected to severe oxidation conditions. Furthermore, it will be noted that the data show the acridine, which is an effective inhibitor in mineral oil, fails in compositions including octene-1 polymer as the hydrocarbon polymer therein. It may be concluded, therefore, that the composition of the present invention containing carbazole gives a markedly superior result over the prior art compositions. It will be especially noted that the neutralization value, which is a measure of the organic acid content, was only 7.6 when using 2% by weight of carbazole in the composition of the present invention as compared with a value of 14.0 when using 2% by weight of acridine in the octene-1 polymer. This reflects that much less oxidation occurred when using the acridine as inhibitor.

It is indeed surprising that acridine, which is a heterocyclic compound closely related to carbazole and which is known as an anti-oxidant for lubricating oil, had very adverse effects in compositions including olefin polymer with respect to viscosity increase during oxidation. It may be seen that the composition of the present invention provides a lubricating oil which is unsusceptible to oxidation and sludge formation.

The oxidation test employed in the present invention is carried out as follows in a 200 cc. glass three-necked round bottom flask. The central neck of this flask is 5 cm. long and has an inside diameter of 3 cm. The flask has two opposed side necks which are 6 cm. long and 1.5 cm. inside diameter, and are situated at a 30° angle with the central neck, perpendicular to the surface of the spherical flask. The stirrer is a glass rod 0.5 cm. in diameter, entering the flask through a glass tube bearing held in place by a rubber stopper in the central neck, with two glass blades 1.0 cm. long by 0.7 cm. wide welded to opposite sides of the bottom end of the glass rod at a 30° angle with the vertical. The stirrer is driven by a 1750 R. P. M. motor connected to the stirrer by a rubber tubing coupling. The blades of the stirrer are situated about 0.5 cm. from the bottom of the flask and spin in such a direction that their propeller-like action circulates the oil to the bottom of the flask, up along the sides of the flask, back to the center of the flask, and down to the stirrer blades again. A considerable amount of air is sucked down with the descending oil and intimately contacted with it by the action of the stirrer. A thermometer well 5 cm. long and 1.0 cm. inside diameter is situated in one side of the flask equidistant from the two side arms. During the oxidation the flask is about two-thirds immersed in an oil bath maintained at 375° F. The temperature of the oil in the flask is usually 5° to 10° F. below the temperature of the oil bath.

The oxidation test is carried out in the specially constructed flask by stirring 100 cc. of the sample in the presence of air for sixteen hours at 375° F. At the end of that time the flask is removed from the oil bath and tests obtained on the oxidized oil.

The neutralization value which is used as a method of test is described in A. S. T. M. Standards for Petroleum Products and Lubricants prepared by A. S. T. M. Committee D-2, November, 1948 and designated "Tentative Method of Test for Neutralization Value (Acid and Base Numbers) by Color Indicator Titration," A. S. T. M. designation: 974-48T.

The carbazole making up a component of the present invention is only soluble to a small extent in the olefinic polymer making up the other component. For example, carbazole will dissolve in an olefin polymer of the type described to the extent of about 1% by weight. Larger amounts than 1% by weight remain in the composition as a dispersion or as a suspension. It is highly desirable that the carbazole be in a dispersion or suspension in the olefinic polymer because it is believed that in this condition it is available to react and inhibit the oxidation characteristics of the olefinic polymer when the composition is exposed to such conditions.

In order to bring about the desired dispersion or suspension of the carbazole in the olefinic polymer, it may be desirable to add to the composition a suitable dispersing agent. Numerous compounds of this type are well known to the skilled worker and are typified by materials such as alkali metal petroleum sulfonates, ethylene oxide-fatty acid reaction products, zinc or copper naphthanates, alkali metal di-octyl succinate sulfonate, and the like. The desired amount of carbazole may also be admixed with the octene-1 polymer more readily by adding a solubilizing agent which will increase the solubility of the carbazole in the octene-1 polymer. Examples of suitable solubilizing agents include the cellosolves such as butyl or benzyl cellosolve, the mono-, di-, or tri-oleic, palmitic, or lactic glycerol esters, and the like.

The nature and objects of the present invention having been completely described and illustrated, what I wish to claim as new and useful and to secure by Letters Patent is:

1. An oxidation resistant lubricating oil composition which comprises a polymer boiling in the lubricating oil boiling range of an alpha olefin having from 5 to 10 carbon atoms in the molecule, said polymer having lubricating oil properties and being susceptible to oxidation and not less than 0.1% by weight of carbazole.

2. An oxidation resistant lubricating oil composition which comprises 98% by weight of a polymer of octene-1 boiling in the lubricating oil boiling range having lubricating oil properties and susceptible to oxidation and 2% by weight of carbazole.

3. An oxidation resistant lubricating oil composition which comprises a lubricating oil polymer of an alpha olefin having from 5 to 10 carbon atoms in the molecule in an amount in the range between 99.9% and 97.5% by weight and carbazole in an amount in the range between 0.1% and 2.5% by weight.

4. A composition in accordance with claim 3 in which the olefin is octene-1.

5. An oxidation resistant lubricating oil composition which comprises a polymer of octene-1 boiling in the lubricating oil boiling range having lubricating oil properties and being susceptible to oxidation and not less than 0.1% by weight of carbazole.

RAYMOND L. HEINRICH.

REFERENCES CITED

The following references are of record in the file of this patent:

UNITED STATES PATENTS

| Number | Name | Date |
|---|---|---|
| 2,037,932 | Semon | Apr. 21, 1936 |
| 2,370,552 | Lincoln et al. | Feb. 27, 1945 |

OTHER REFERENCES

Industrial & Engineering Chem.—vol. 23–No. pgs. 604–610.